United States Patent [19]

Guerbet

[11] 4,317,075

[45] Feb. 23, 1982

[54] DEVICE FOR TRANSFORMING AN ALTERNATING CURRENT TO A DIRECT CURRENT, AND APPLICATION THEREOF TO THE CHARGING OF STORAGE BATTERIES

[76] Inventor: François Guerbet, 6, rue de Vergennes, 78000 Versailles, France

[21] Appl. No.: 43,900

[22] Filed: May 30, 1979

[51] Int. Cl.$^3$ .............................................. H02J 7/06
[52] U.S. Cl. ..................................... 320/53; 320/19; 320/35; 320/57; 320/59
[58] Field of Search ...................... 320/22, 57, 59, 19, 320/53, 35, 36; 323/75 A, 75 F

[56] References Cited

U.S. PATENT DOCUMENTS

| | | | |
|---|---|---|---|
| 2,091,708 | 8/1937 | Gilson | 320/59 |
| 2,453,960 | 11/1948 | Arvidsson | 320/59 X |
| 2,563,234 | 8/1951 | Godschalk et al. | |
| 2,607,910 | 8/1952 | Ransom et al. | 320/59 X |
| 2,802,165 | 8/1957 | Mamon | 320/59 X |
| 3,193,750 | 7/1965 | Chait | 320/57 X |
| 4,195,256 | 3/1980 | Car michael | 320/59 X |

FOREIGN PATENT DOCUMENTS 684443 of 1939 Fed. Rep. of Germany .
558345 of 1943 United Kingdom .

Primary Examiner—Robert J. Hickey
Attorney, Agent, or Firm—Shlesinger, Arkwright, Garvey & Dinsmore

[57] ABSTRACT

A device for transforming an alternating current to a direct current particularly adapted for charging of storage batteries, the device comprising a transformer, a rectifier element in series with the secondary of the transformer, a semiconductor rectifier bridge having an alternating current diagonal in series with the primary of the transformer and a direct current diagonal connected to the output of the rectifier element for diverting and rectifying part of the alternating current and delivering it in the same direction as the secondary current.

8 Claims, 3 Drawing Figures

DEVICE FOR TRANSFORMING AN ALTERNATING CURRENT TO A DIRECT CURRENT, AND APPLICATION THEREOF TO THE CHARGING OF STORAGE BATTERIES

The invention concerns a device for transforming converting alternating current of a given voltage to direct current at a determined voltage; this is applied in particular to chargers of storage batteries.

By direct current is meant a non-alternating current the intensity of which may or may not be constant (i.e., the current may be modulated).

There are at present two basic types of charges which can be directly connected to an alternating current supply such as ordinary house current in order to produce a direct current with appropriate voltage to recharge a storage battery. The first type is entirely electronic, and is comprised of voltage divider circuits, which are very expensive to make reliable.

The other more traditional type comprises a transformer which feeds a diode bridge, delivering a rectified voltage of appropriate value in terms of magnitude and polarity. However, at the beginning of the charging, when the storage battery is in an appreciably discharged state, the magnitude of the current passing the transformer is very substantial, and overloads the transformer. Classical means of avoiding this inconvenience consist of inserting resistances in the primary and secondary circuits of the transformer in order to limit the current and dissipate its energy in the form of heat.

However, this form of current-limitation acts to the detriment of the overall energy efficiency. As a solution it is in fact a rather unsatisfactory compromise between two inevitable opposing considerations—these being, on the one hand, the maximum possible reduction of the transformer power required as a result of high energy dissipation (i.e. the goal of minimizing transformer weight and cost), and on the other hand the achieving of the highest possible overall energy efficiency during the charging.

The present invention offers a satisfactory solution to this problem in the form of a charger which can be supplied with a lower-power transformer while yielding a far superior energy efficiency.

Another objective of the invention is to devise a charger which enables one to recharge a stack of several storage batteries in series, with charging currents suitable for each storage battery in that they are adapted to each battery's state of charge or discharge.

More generally, the invention extends to any device for transforming an alternating current supply of given voltage to direct current or desired voltage, comprising at least one transformer furnished with a primary and a secondary adapted to the desired transformation, and comprising at least one rectifying element connected in series with the secondary of each transformer. According to the present invention, the device comprises means for direct application and rectification of the current, which means are mounted in series with the primary of the transformer or transformers and are connected to the output of the secondary rectification element or elements, and whereby said means are adapted to divert and rectify a part of the alternating supply current and deliver it to the output of the rectification element or elements such that it has the same direction as the secondary current leaving the latter rectifying element or elements.

According to a simple and inexpensive embodiment of the invention, the means of direct application and rectification comprise a semiconductor rectifying bridge, in particular a diode bridge, containing an alternating current diagonal in series with the primary of the transformer or transformers and a direct current diagonal connected to the output of the rectifying element or elements in the secondary, so as to deliver a direct current component which has the same direction as the secondary current output from the latter rectifying element or elements.

In addition, the device according to the invention permits one to divert part of the supply current and limit the current which passes the transformer, thereby reducing the power required for the transformer while at the same time ensuring high overall energy efficiency, since the diverted component of the current is not dissipated without benefit but is reapplied and utilized along with the secondary current.

The device can also serve as an automatic charger of storage batteries, in particular furnishing the current necessary for a rapid charge at the beginning of charging, while limiting the current which passes through the transformer.

In the case of a charger applied to charge a stack of n storage batteries connected in series, the device comprises n parallel transformers, n rectifying elements each connected in series with the secondary of a transformer and connected at its (the element's) output to the terminals of one of the storage batteries so as to apply a voltage opposite to the battery's internal voltage, and means of direct application common to the n transformers, in order to divert and rectify part of the alternating current supply and deliver it to the terminals of the two end storage batteries in the stack, oppositely to the internally generated voltage of said stack of storage batteries.

The following description refers to the attached drawings and is presented to furnish examples and not to limit the embodiments of the invention but rather to facilitate better understanding of it. These drawings are made an integral part of the specification.

Figure 1:
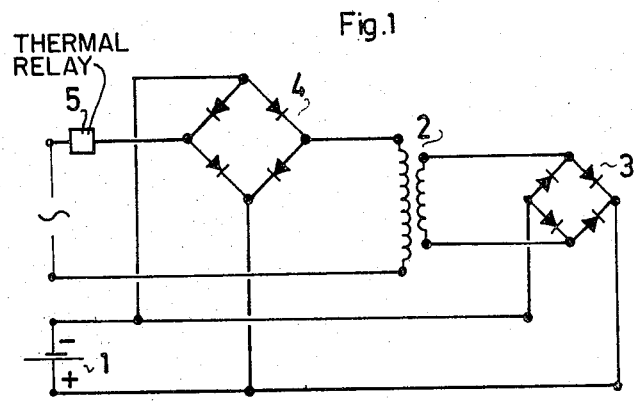
FIG. 1 is an electrical schematic of a storage battery charger.

The charger represented in FIG. 1 is designed to provide a current for recharging a storage battery 1. This charger is directly connected to an alternating current supply such as house current, and comprises a transformer 2, a rectifier bridge made up of diodes 3 which is connected in series with the secondary of the transformer, a rectifier bridge made up of diodes 4, which diodes are not controlled diodes in this example, and a thermal relay 5 inserted in the primary circuit ahead of the bridge 4.

The function of the rectifier bridge 4 is to divert and rectify part of the primary current and to deliver it to the terminals of the storage battery. For this purpose, bridge 4 has an alternating current diagonal in series with the primary of the transformer and a direct current diagonal connected to the output of the secondary bridge 3 such that the said delivered current has the same direction as the secondary current leaving the bridge 3.

Additionally, at the beginning of the charging the rectifying bridge 4 strongly draws from and substantially limits the voltage at the terminals of transformer 2. The storage battery receives the current from bridge 4 plus the current from secondary bridge 3. At the conclusion of charging, bridge 4 is "stifled", while secondary bridge 3 which is fed by the transformer draws less and less, such that the charging current decreases and adjusts to the charge state of the storage battery, until at the completion of the charging there is nearly total blockage of current through secondary bridge 3.

An automatic self-regulating charger is also proposed, in which the current passing through the transformer stays limited, with litle loss of energy. Such a charger thus offers the double advantage of substantially reducing (by nearly one half) the necessary power of the transformer (thereby reducing its weight and cost), and at the same time yielding a high overall energy efficiency for the charging (approximately 15% losses, as against 30% in the case of classical chargers using resistances for limitation).

The thermal relay 5 (a relay tripped by temperature or its analog) provides an improvement to the system by detecting, if need be, heating at a primary or secondary point of the circuit, and thereupon limiting the intensity of the current drawn in that circuit as a function of that heating.

Figure 2:
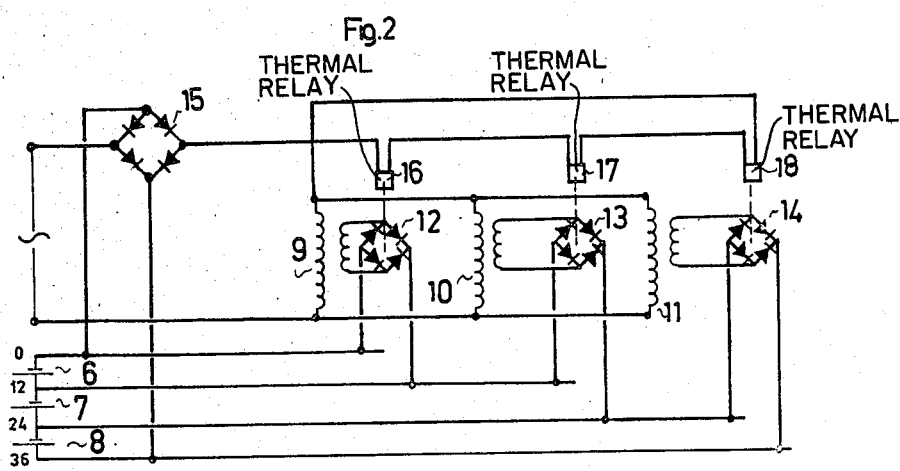
FIG. 2 is an electrical schematic of a charger of a stack of several storage batteries which may be unsymmetrically discharged, i.e., in different states of discharge.

The charger example represented in FIG. 2 allows one to recharge a stack of several storage batteries, here three storage batteries 6, 7, and 8, with an individual power supply to each storage battery as a function of its state of charge.

The design of this charger is analogous to that of the preceding charger. It comprises three transformers in parallel, 9, 10, and 11, three secondary rectifying bridges 12, 13, and 14, each inserted in series with the secondary of one of the transformers and connected at its (the bridge's) output to the terminals of one of the storage batteries in the stack of storage batteries, and further comprises a principal rectifying bridge 15 inserted in the primary circuit of the common power supply of the three transformers, such that said bridge diverts and rectifies part of the alternating current supply and delivers it to the terminals of the stack of storage batteries.

Each secondary bridge 12, 13, and 14 is connected to the terminals of a storage battery in order to subject the latter to a charging voltage in opposition to the battery's internally generated voltage, and the direct current diagonal of the principal bridge 15 is connected to the terminals of the two outside storage batteries in the stack, in opposition to the internally generated voltage of the stack.

Such a charger furnishes the advantages described above, and in addition has the advantage of providing individualized charging for each of the storage batteries in the stack, which may be unsymmetrically discharged, may have batteries with different degrees of discharge, without damage occurring, since the compensation in recharging is automatic.

In addition, in the example represented by FIG. 2, the thermal relays or thermal relay analogues 16, 17, and 18 may be inserted in series in the primary power supply circuit and tied in at the level of each secondary circuit (namely, at the level of secondary bridges 12, 13, and 14) for the purpose of detecting heating at these points and limiting the current drawn in the primary circuits as a function of that heating.

Figure 3:
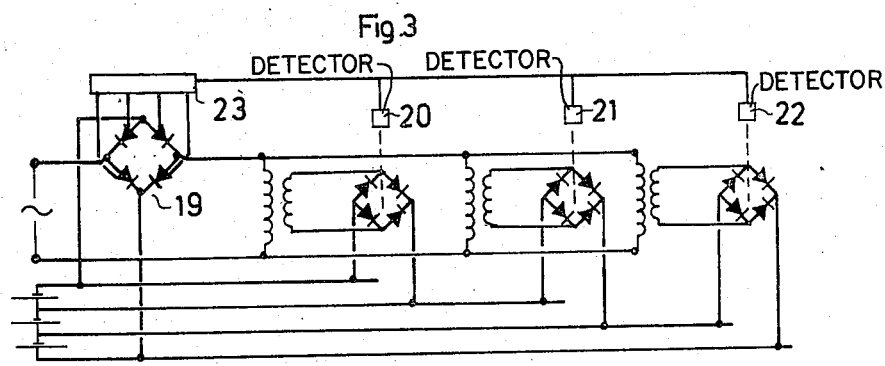
FIG. 3 is a variant of the charger of FIG. 2.

In FIG. 3 a variant is presented which operates by a similar principle but in which the principal bridge 19 made up of semiconductors is a centering bridge, in which the diodes can be simultaneously activated by a control signal so as to be conductors or non-conductors in a given direction. The thermistors or voltage detectors 20, 21, and 22 are located at the level of each secondary circuit (in particular, at the level of the secondary bridges), and are connected to electronic control means 23 in bridge 19 in order to control the delivery of current as a function of the heating and/or the voltage detected in the secondary circuits.

It is understood that the present invention is not limited by the preceding description, but includes all variants. In particular, diodes are referred to, but it is clear that equivalent elements can be adapted and provided for in their place, such as thyristors, etc.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. Device for transforming an alternating current supply of a given voltage to direct current of a desired voltage, comprising at least one transformer having a primary which is part of a primary circuit and a secondary which is part of a secondary circuit, and comprising at least one rectifying element which is in the secondary circuit and is connected in series with the secondary of said at least one transformer; means for direct application and rectification of the alternating current in series with the primary of said at least one transformer and connected to the output of said at least one rectifying element in said secondary circuit, and said means being adapted to divert and rectify a part of the alternating current supply in the primary circuit and deliver the rectifying current to the secondary circuit at the output of said at least one rectifying element such that said resulting current has the same direction as the secondary current leaving said at least one rectifying element.

2. Transformation device according to claim 1 wherein said means for direct application and rectification comprises a rectifier bridge of semiconductors and having an alternating current diagonal in series with the primary of said at least one transformer and a direct current diagonal connected to the output of said at least one rectifying element in the secondary, so as to deliver a direct current component having the same direction as the secondary current leaving the latter rectifying element or elements.

3. Transformation device according to claim 2, wherein said semiconductor rectifier bridge comprises a bridge of non-controlled diodes.

4. Transformation device according to claims 2 or 3 and including a thermal relay in the primary circuit ahead of the semiconductor rectifier bridge, for detecting heating at a point of said primary circuit, and limiting the current drawn in the primary circuit as a function of that heating.

5. Transformation device according to claim 4 and including at least one thermal relay in the primary circuit of said at least one transformer; characterized in that said thermal relay has its detection function located at the level of a rectifying element in the secondary, for detecting heating at that element and thereupon limiting the current drawn in the primary circuit as a function of that heating.

6. Transformation device according to claim 2 characterized in that said semiconductor rectifier bridge is a controlled bridge having control means so as to conduct in a given direction or not conduct and is connected to at least one voltage detector having its detection function located at the level of the secondary circuit, for each secondary circuit, and which is connected to said control means of said bridge so as to control the delivery of current as a function of the heating or voltage in said secondary circuit.

7. Transformation device for charging of a stack of n storage batteries connected in series comprising n transformers in parallel, n rectifying elements each being connected in series with a transformer secondary and connected at the output of said rectifying elements to the terminals of a storage battery for applying a voltage to the respective battery in opposition to the battery's internally generated voltage, and means for direct application and rectification, said means being common to each of said n transformers, for diverting and rectifying part of the alternating current supply and delivering it to the terminals of the two outside storage batteries of the stack, in opposition to the internally generated voltage of said stack of batteries.

8. Transformation device according to claim 2 characterized in that said semiconductor rectifier bridge is a controlled bridge having control means so as to conduct in a given direction or not conduct and is connected to at least one thermistor having its detection function located at the level of the secondary circuit, for each secondary circuit, and which is connected to said control means of said bridge so as to control the delivery of current as a function of the heating in said secondary circuit.

* * * * *